(12) United States Patent
Shin et al.

(10) Patent No.: US 10,663,726 B2
(45) Date of Patent: May 26, 2020

(54) HEAD-UP DISPLAY APPARATUS FOR VEHICLE

(71) Applicant: Hyundai Mobis Co., Ltd., Seoul (KR)

(72) Inventors: Yu Jin Shin, Yongin-si (KR); Byung Ki Kim, Yongin-si (KR); Chan Seo Goo, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/015,590

(22) Filed: Jun. 22, 2018

(65) Prior Publication Data

US 2018/0373037 A1 Dec. 27, 2018

(30) Foreign Application Priority Data

Jun. 26, 2017 (KR) .......................... 10-2017-0080498

(51) Int. Cl.
| | |
|---|---|
| *G02B 27/01* | (2006.01) |
| *B60K 35/00* | (2006.01) |
| *B60R 11/02* | (2006.01) |

(52) U.S. Cl.
CPC .......... *G02B 27/0149* (2013.01); *B60K 35/00* (2013.01); *B60R 11/02* (2013.01); *B60K 2370/334* (2019.05); *G02B 2027/0154* (2013.01); *G02B 2027/0156* (2013.01); *G02B 2027/0169* (2013.01)

(58) Field of Classification Search
CPC ...... G02B 27/01–0189; B60R 7/00–14; B60K 35/00; B60K 37/00–06
See application file for complete search history.

(56) References Cited

U.S. PATENT DOCUMENTS

| | | | |
|---|---|---|---|
| 2014/0368097 A1* | 12/2014 | Yomogita | G02B 27/0149 312/23 |
| 2018/0364479 A1* | 12/2018 | Kwak | G02B 27/0149 |

* cited by examiner

*Primary Examiner* — Cara E Rakowski
*Assistant Examiner* — Christopher A Lamb, II
(74) *Attorney, Agent, or Firm* — H.C. Park & Associates, PLC

(57) ABSTRACT

An HUD apparatus for a vehicle including: a housing mounted in a vehicle; a cover member configured to open/close the entrance of the housing; a combiner operated separately from the cover member, and protruding outward from the inside of the housing; a rotating cam rotatably installed in the housing, rotated by rotation power, and having guide grooves; a first gear member having one side connected to the cover member and the other part inserted into the guide groove, and operated by rotation of the rotating cam so as to move the cover member; and a second gear member having one side connected to the combiner and the other side inserted into the guide groove, and operated by the rotation of the rotating cam so as to move the combiner to the outside or inside of the housing.

7 Claims, 10 Drawing Sheets

HEAD-UP DISPLAY APPARATUS FOR VEHICLE

CROSS-REFERENCES TO RELATED APPLICATION

This application claims priority from and the benefit of Korean Application No. 10-2017-0080498, filed on Jun. 26, 2017, which is hereby incorporated by reference for all purposes as if set forth herein.

BACKGROUND

Field

Exemplary embodiments relate to a head-up display (HUD) apparatus for a vehicle, and more particularly, to an HUD apparatus for a vehicle, which can reduce noise which is caused when a combiner and a cover are operated, and improve opening/closing performance of the combiner and the cover.

Discussion of the Background

In general, HUD represents a system which displays various pieces of vehicle information as virtual images on the wind shield glass of a vehicle, such that a driver can check the vehicle information while keeping eyes forward during driving.

A combiner-type HUD has a structure in which a combiner is stored in a predetermined space of a vehicle at normal times and deployed in case of necessity.

In the conventional combiner-type HUD, the combiner is horizontally moved and deployed through a lead screw or the like. In this case, the opening/closing speed of the combiner is decided by the size of a lead of the lead screw and the motor speed. Furthermore, the combiner is deployed at low speed, and the angle adjustment of the combiner depends on the size of the lead and the angle of a step motor.

Furthermore, an operation for a pop-up of the combiner is performed through a pin of a cam wheel, and the combiner is rotated according to the shape of a carrier separated from the pin. Therefore, the operation may not be smoothly performed, and operation noise may be increased when the operation is transferred to the carrier from the pin.

The above information disclosed in this Background section is only for enhancement of understanding of the background of the invention and, therefore, it may contain information that does not constitute prior art.

SUMMARY

Exemplary embodiments of the present invention provide an HUD apparatus for a vehicle, which can reduce noise which is caused when a combiner and a cover are operated, and improve opening/closing performance of the combiner and the cover.

In one embodiment, an head-up display (HUD) apparatus for a vehicle may include: a housing mounted in a vehicle; a cover member configured to open/close the entrance of the housing; a combiner operated separately from the cover member, and protruding outward from the inside of the housing; a rotating cam rotatably installed in the housing, rotated by rotation power applied thereto, and having a plurality of guide grooves; a first gear member having one side connected to the cover member and the other part inserted into the corresponding guide groove, and operated by the rotation of the rotating cam so as to move the cover member; and a second gear member having one side connected to the combiner and the other side inserted into the corresponding guide groove, and operated by the rotation of the rotating cam so as to move the combiner to the outside or inside of the housing.

The HUD apparatus may include a tilt gear member connected to the corresponding guide groove, and operated by the rotation of the rotating cam so as to adjust the angle of the combiner.

The housing may include: a housing body having the rotating cam rotatably installed on a side surface thereof, and having an opened top; and a cover guide positioned in the housing body facing the cover member, and having a guide groove formed along a moving part of the cover member so as to guide the cover member.

The cover member may include: a cover body connected to the first gear member, and installed at a position facing the cover guide; and a protrusion protruding from the cover body so as to be inserted into the guide groove formed in the cover guide.

The combiner may include: a first body formed in a plate shape; a second body extended in a curved shape from one side of the first body; and a connection body extended from both sides of the second body, and rotatably connected to the second gear member.

The HUD apparatus may further include a combiner guide positioned at a side surface facing the connection body, and guiding the connection body in a top-to-bottom direction. The combiner may further include a body protrusion detachably installed on the connection body, and covering a side surface of the combiner guide.

The rotating cam may include: a cam body having teeth formed along the circumferential direction; a first guide groove formed at a side surface of the cam body such that the first gear member is inserted into the first guide groove; a second guide groove formed at the side surface of the cam body such that the second gear member is inserted into the second guide groove; and a third guide groove formed at the side surface of the cam body such that the tilt gear member is inserted into the third guide groove.

The first gear member may include: a first link member having a first protrusion inserted into the first guide groove, and hinge-connected to the housing; and a second link member having one side rotatably connected to the first link member and the other side rotatably connected to the cover member.

The second gear member may include: a moving gear part having a second protrusion inserted into the second guide groove; a rotating gear part engaged and rotated with an outer gear formed at a side surface of the moving gear part; a first connection gear rotatably connected to the combiner; and a second connection gear having one side rotatably connected to the first connection gear and the other side fixed to the rotating gear part.

The tilt gear member may include: a tilt lever part having a third protrusion inserted into the third guide groove; and a tilt protrusion member bent from the tilt lever part toward the combiner, and locked to a tilt pin installed at a side surface of the combiner.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DESCRIPTION OF THE ILLUSTRATED EMBODIMENTS

Figure 1:
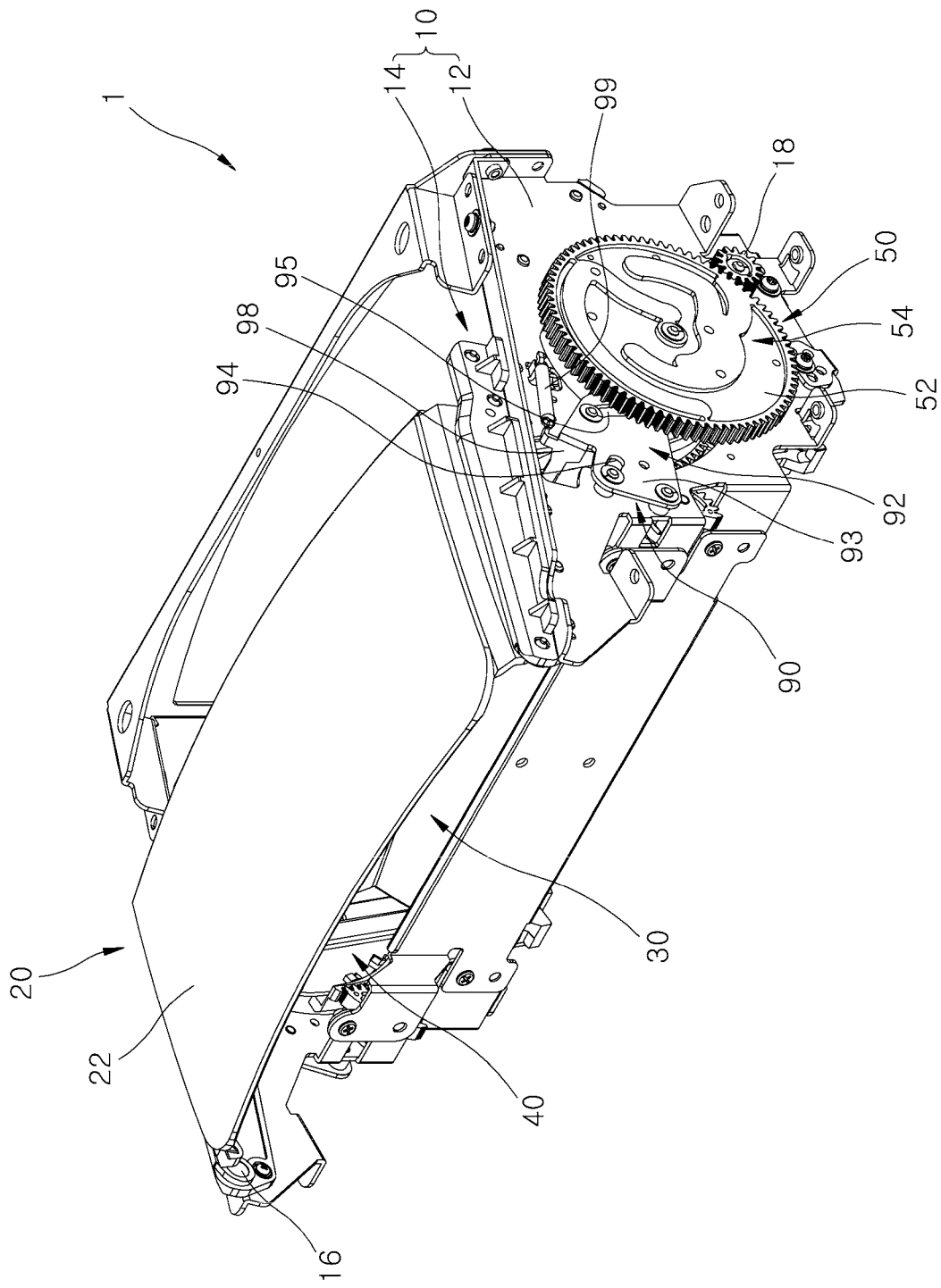
FIG. 1 is a perspective view schematically illustrating an HUD apparatus in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, an HUD apparatus for a vehicle in accordance with an embodiment of the present invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 2:
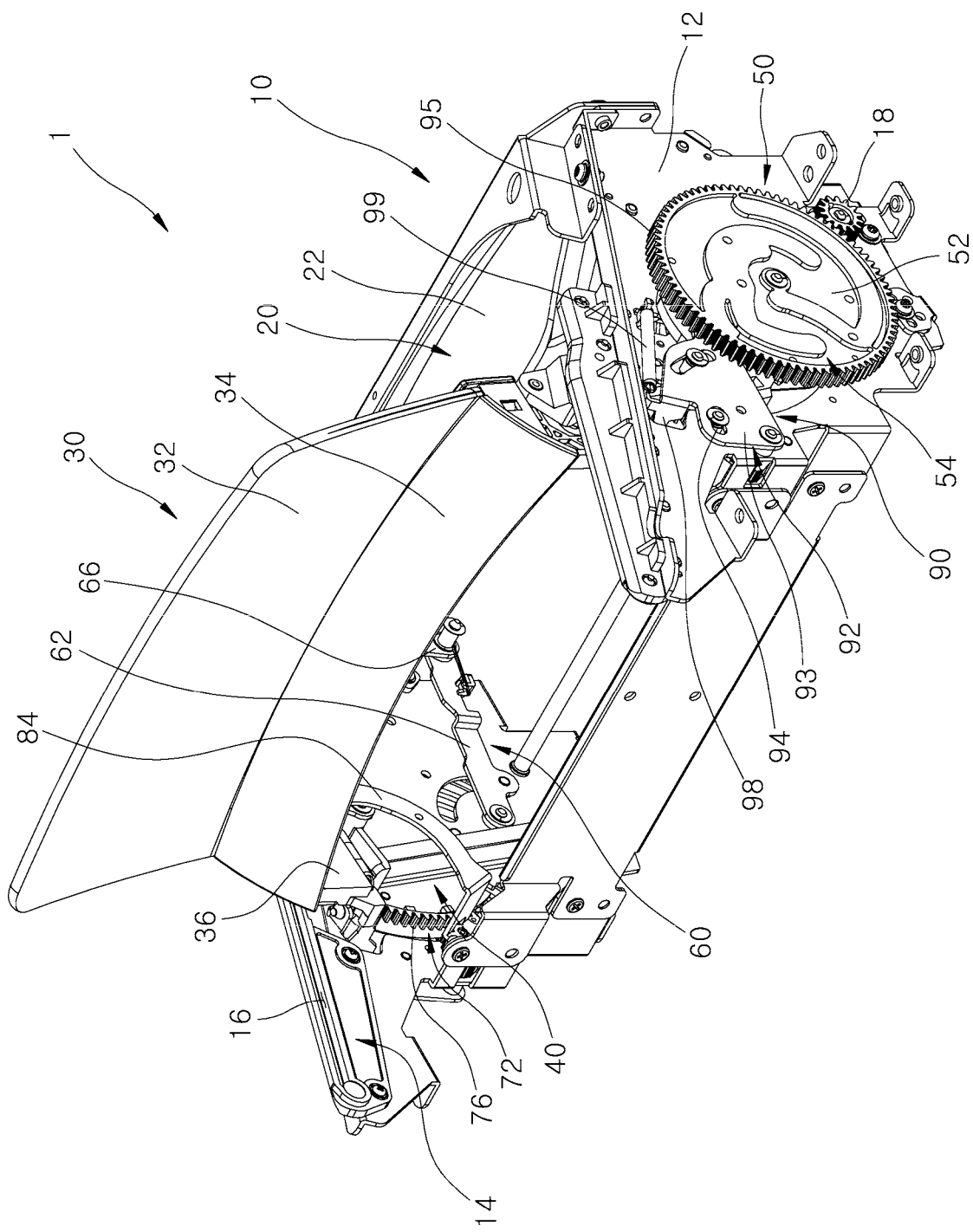
FIG. 2 is a perspective view illustrating that a combiner in accordance with the embodiment of the present invention is moved upward.
Figure 3:
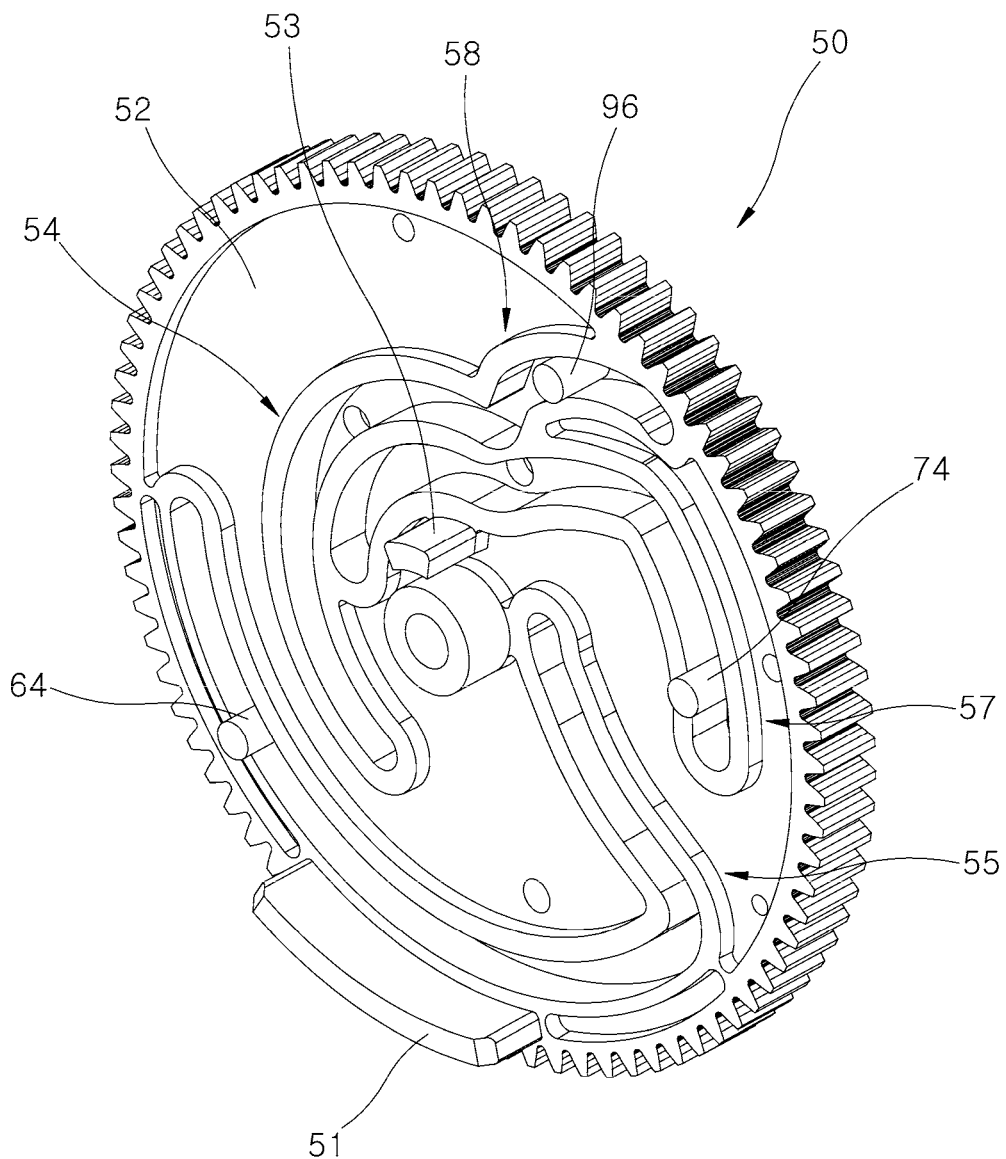
FIGS. 3 and 4 are perspective views illustrating a rotating cam in accordance with the embodiment of the present invention.
Figure 4:
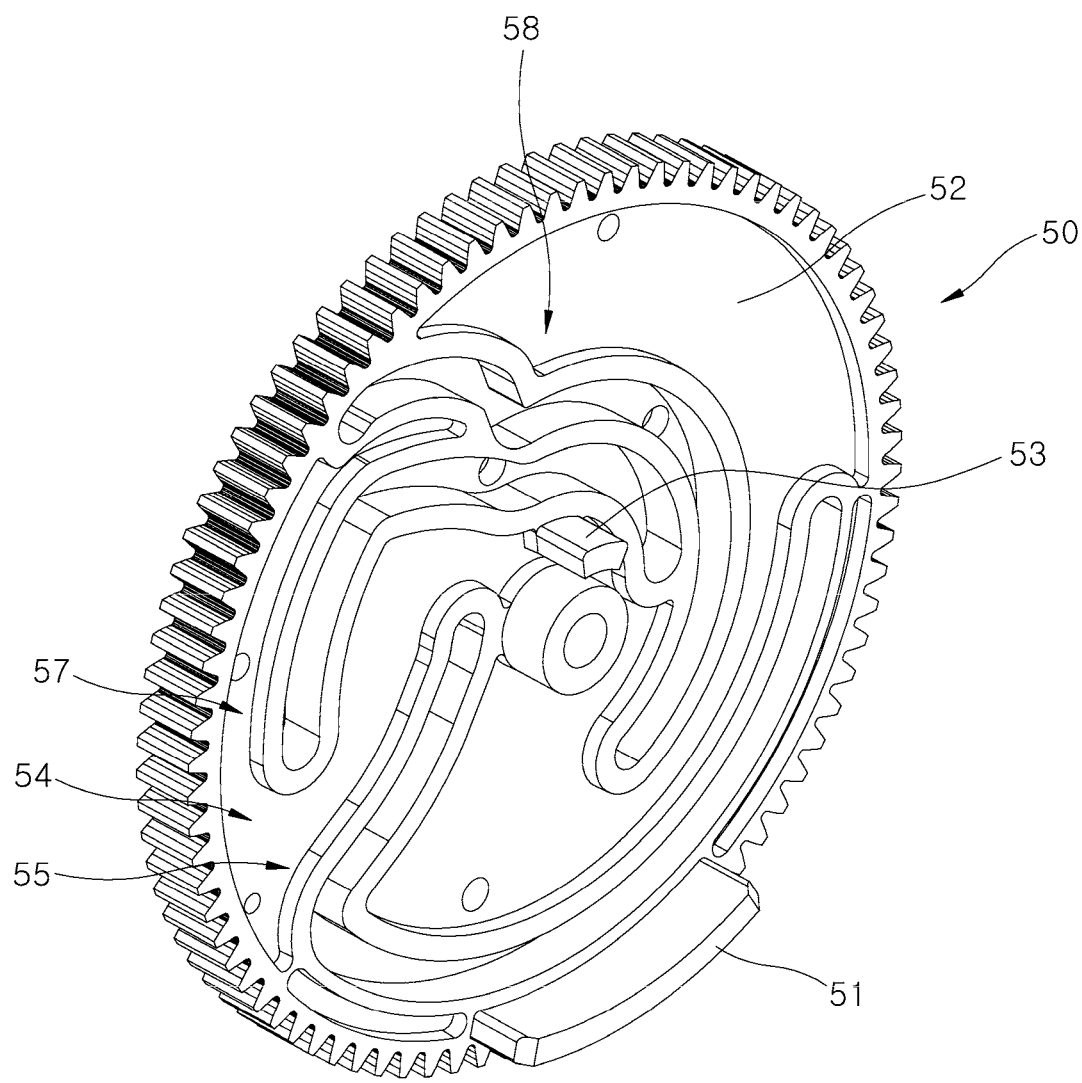
Figure 5:
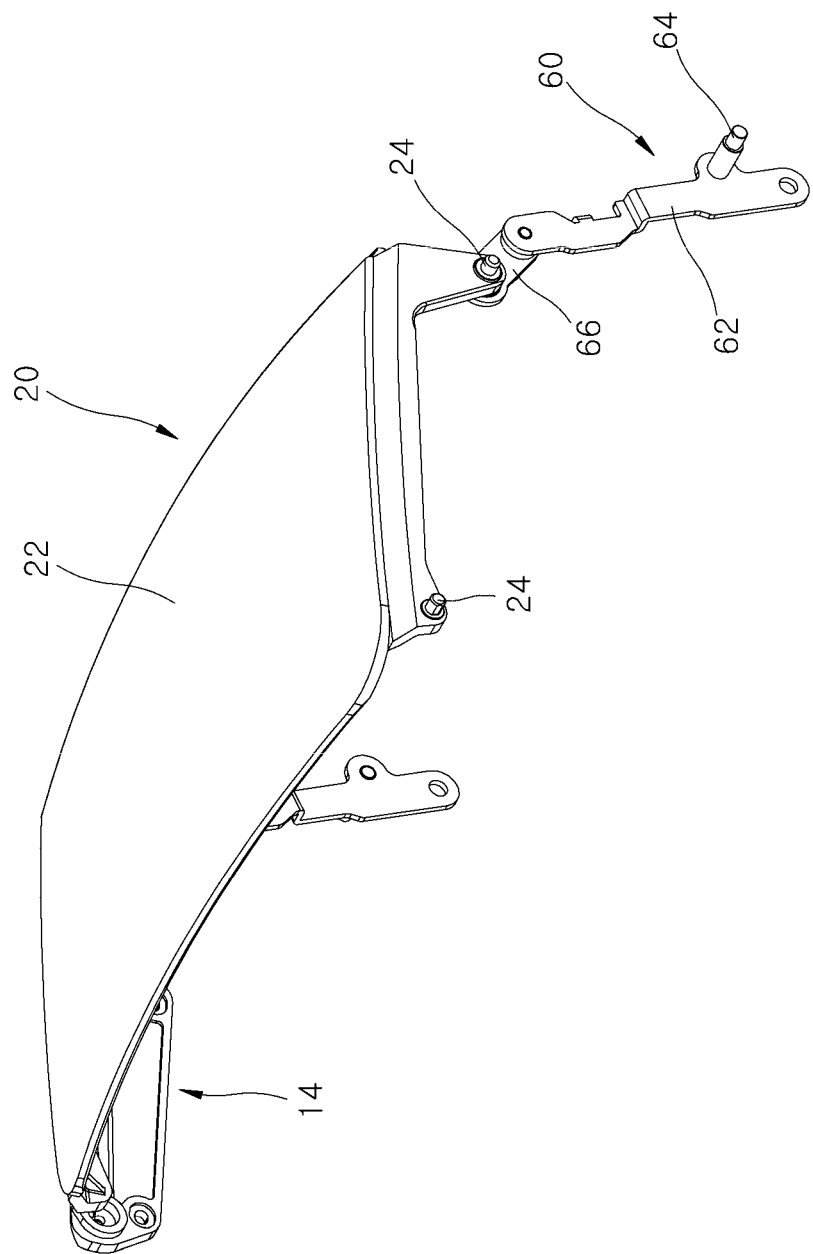
FIG. 5 is a schematic perspective view illustrating that a first gear member and a cover member in accordance with the embodiment of the present invention are connected to each other.
Figure 6:
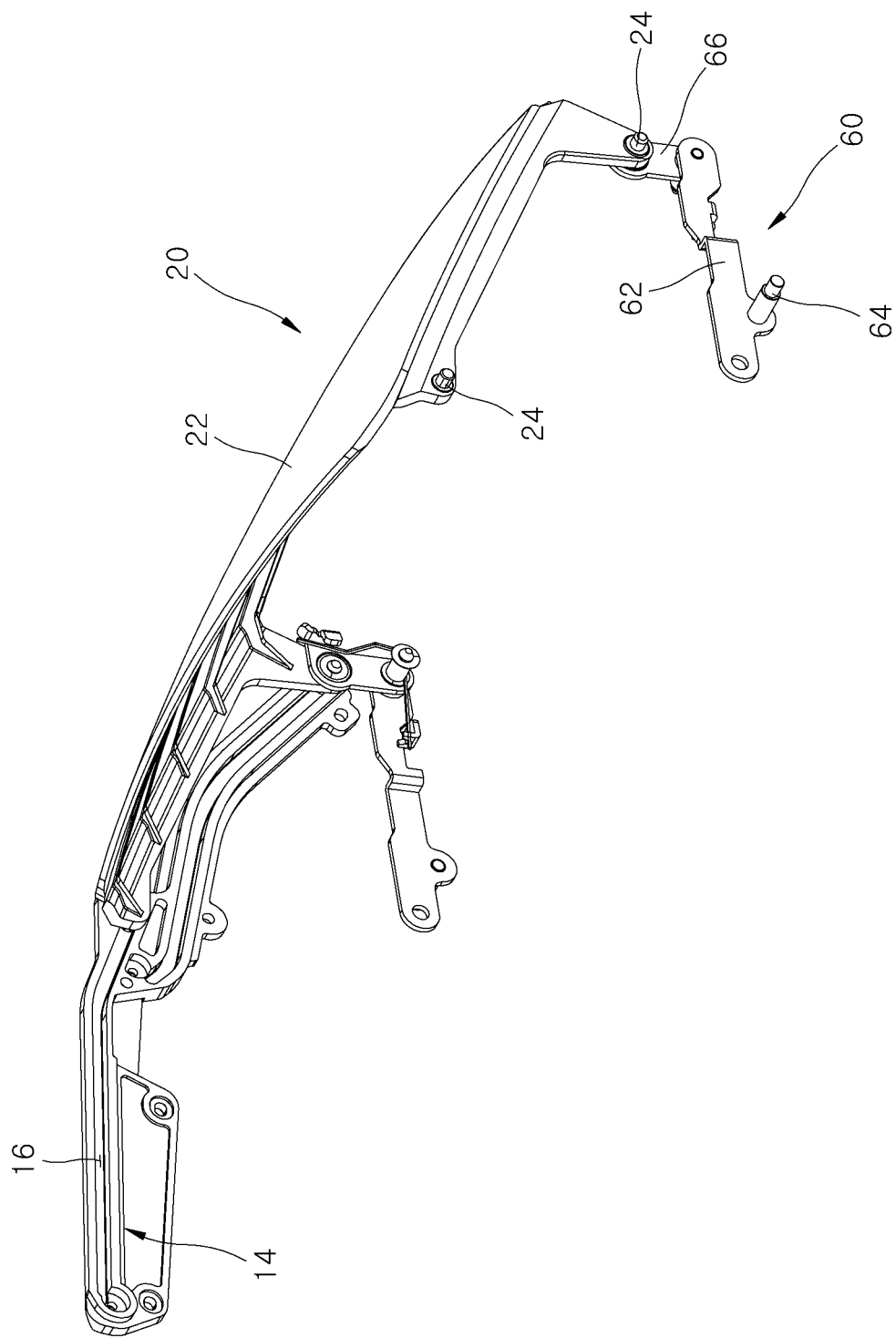
FIG. 6 is a perspective view illustrating that the cover member in accordance with the embodiment of the present invention is moved along a cover guide.
Figure 7:
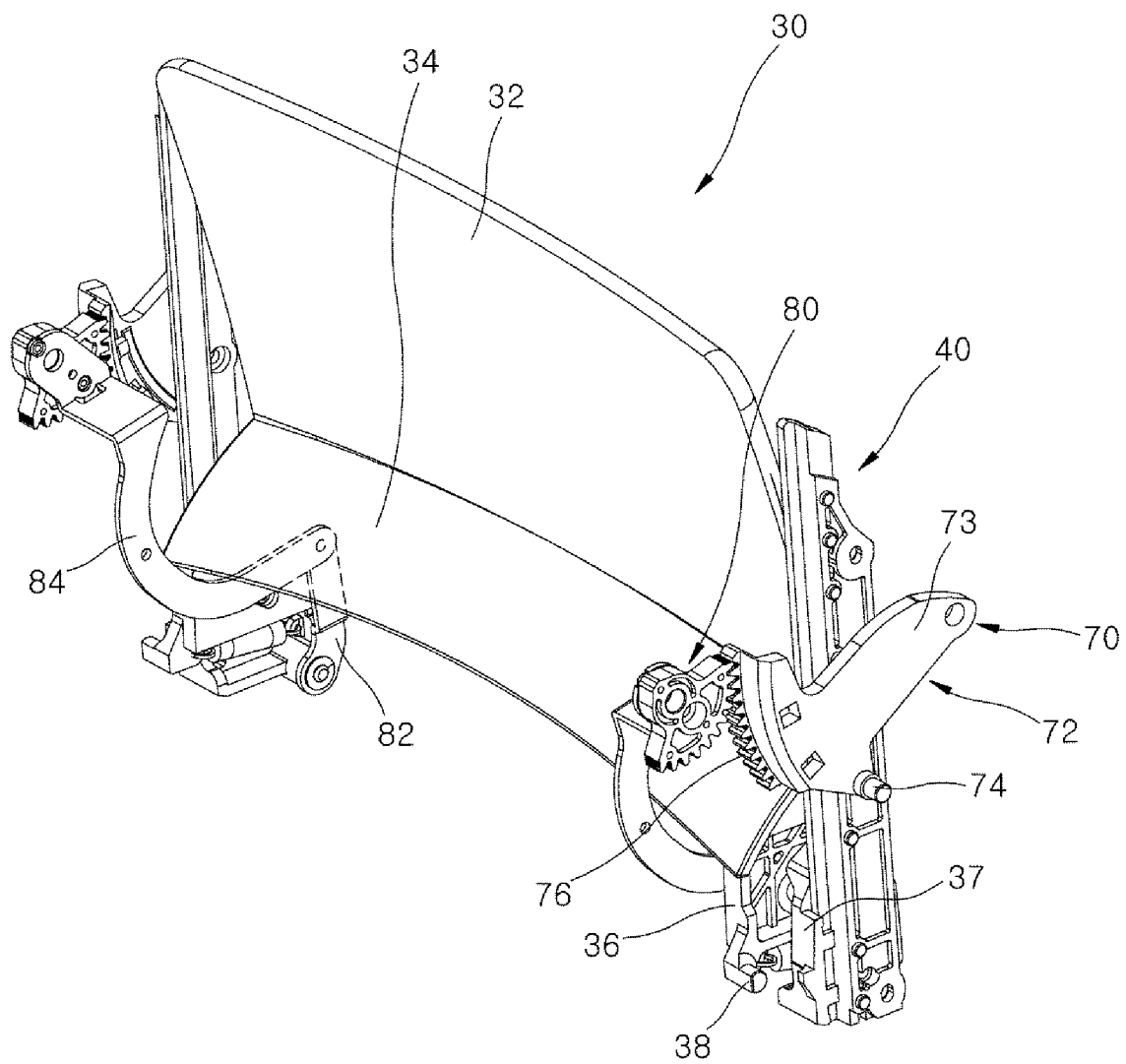
FIG. 7 is a schematic perspective view illustrating that a second gear member and the combiner in accordance with the embodiment of the present invention are connected to each other.
Figure 8:
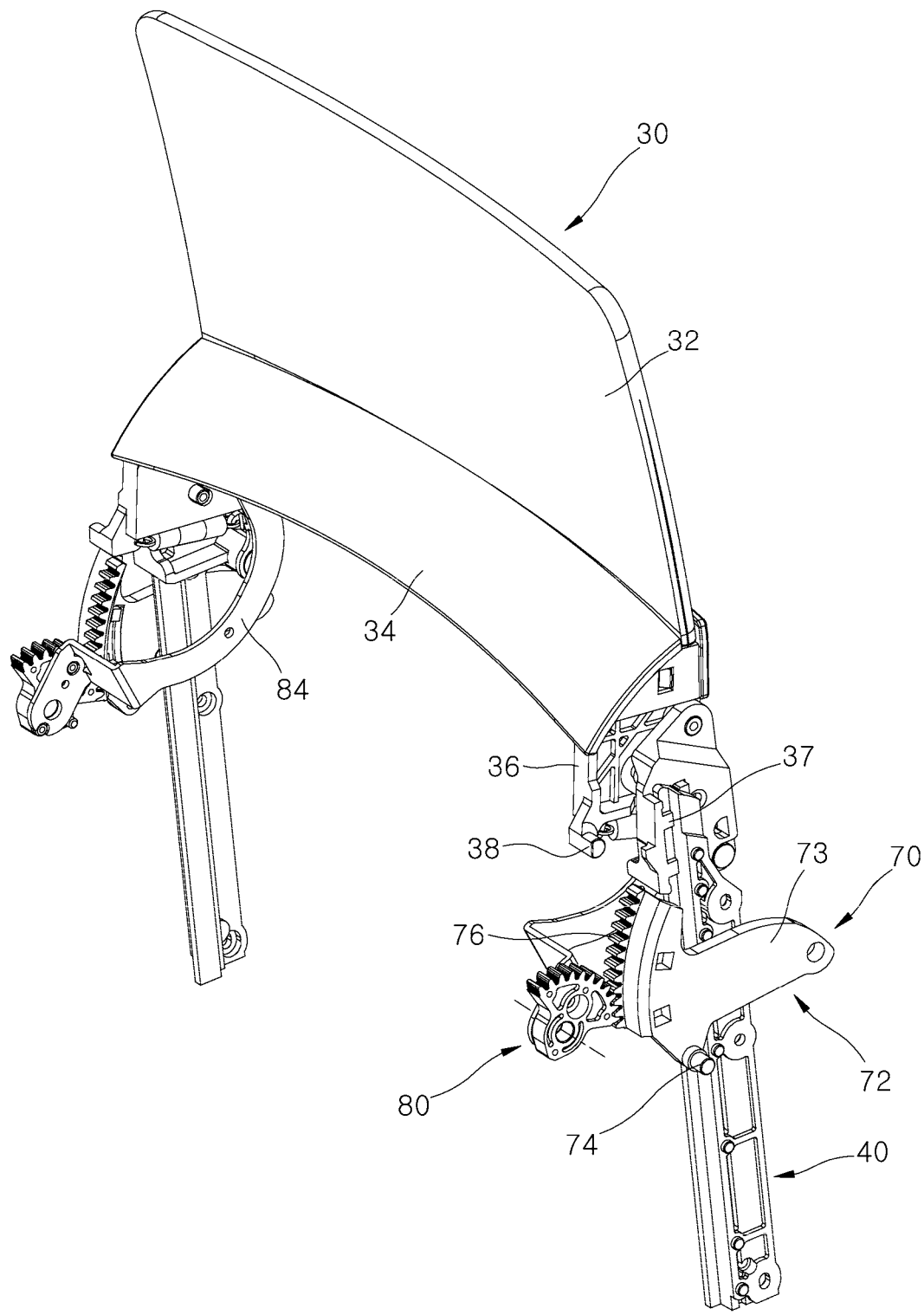
FIG. 8 is a perspective view illustrating that the combiner in accordance with the embodiment of the present invention is moved upward along a combiner guide.
Figure 9:
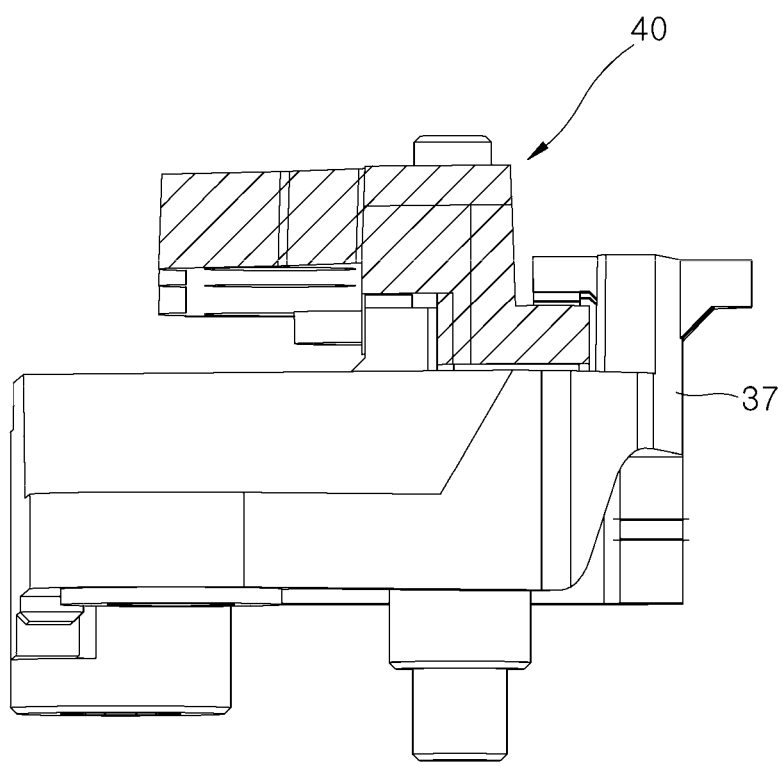
FIG. 9 illustrates that the combiner guide and a body protrusion in accordance with the embodiment of the present invention are connected to each other.
Figure 10:
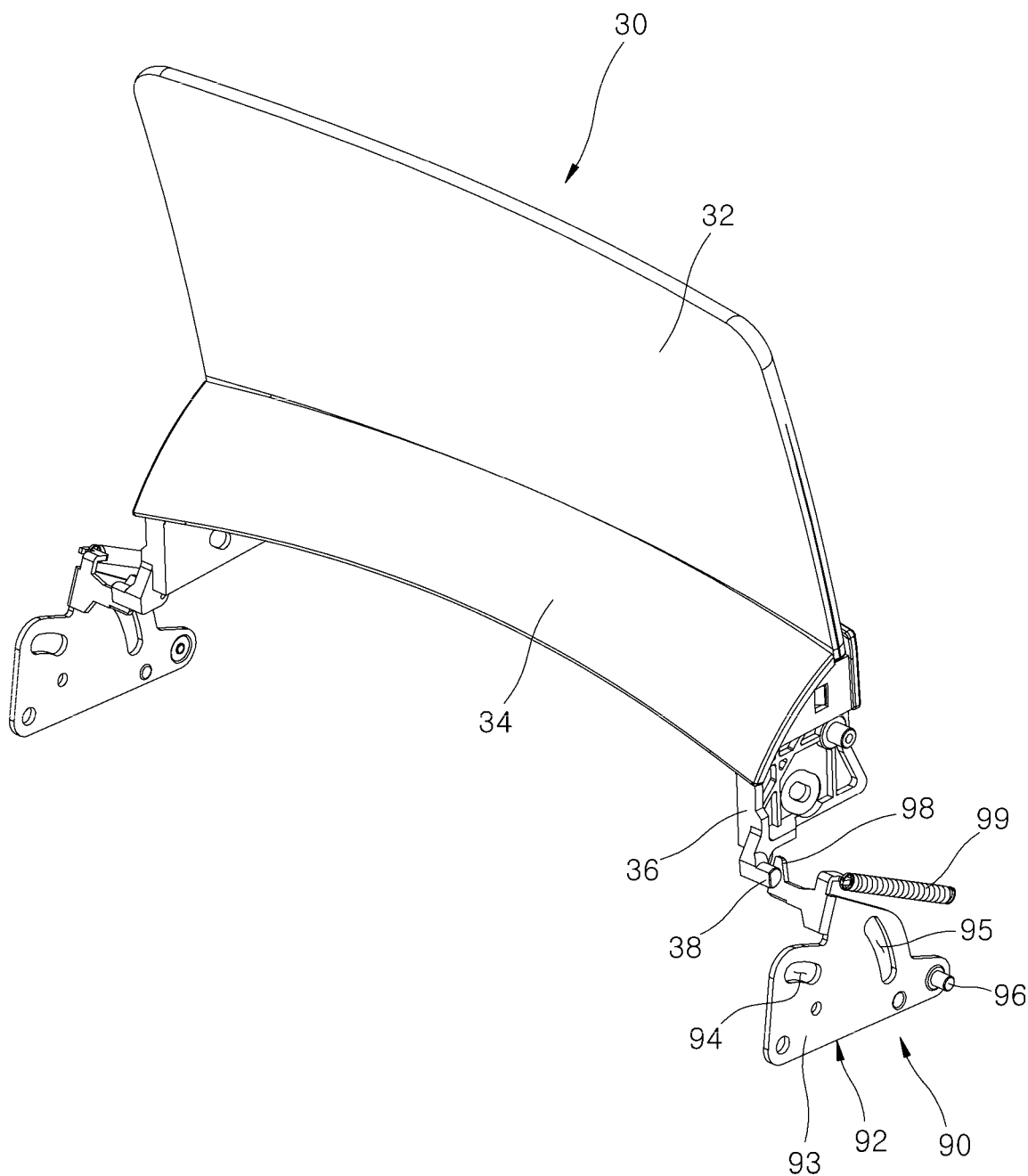
FIG. 10 is a schematic perspective view illustrating that a tilt gear member and the combiner in accordance with the embodiment of the present invention are connected to each other.

FIG. 1 is a perspective view schematically illustrating an HUD apparatus in accordance with an embodiment of the present invention, FIG. 2 is a perspective view illustrating that a combiner in accordance with the embodiment of the present invention is moved upward, FIGS. 3 and 4 are perspective views illustrating a rotating cam in accordance with the embodiment of the present invention, FIG. 5 is a schematic perspective view illustrating that a first gear member and a cover member in accordance with the embodiment of the present invention are connected to each other, FIG. 6 is a perspective view illustrating that the cover member in accordance with the embodiment of the present invention is moved along a cover guide, FIG. 7 is a schematic perspective view illustrating that a second gear member and the combiner in accordance with the embodiment of the present invention are connected to each other, FIG. 8 is a perspective view illustrating that the combiner in accordance with the embodiment of the present invention is moved upward along a combiner guide, FIG. 9 illustrates that the combiner guide and a body protrusion in accordance with the embodiment of the present invention are connected to each other, and FIG. 10 is a schematic perspective view illustrating that a tilt gear member and the combiner in accordance with the embodiment of the present invention are connected to each other.

As illustrated in FIGS. 1 to 3, 6, 7 and 10, the HUD apparatus 1 for a vehicle in accordance with the embodiment of the present invention may include a housing 10, a power transmission gear 18, a cover member 20, a combiner 30, a combiner guide 40, a rotating cam 50, a first gear member 60, a second gear member 70 and a tilt gear member 90.

The housing 10 may be mounted in the vehicle, and various parts such as the cover member 20, the combiner 30, the rotating cam 50, the first gear member 60, the second gear member 70 and the tilt gear member 90 may be installed in the housing 10. The housing 10 in accordance with the present embodiment may include a housing body 12 and a cover guide 14.

The housing body 12 may have the rotating cam 50 rotatably installed on both side surfaces thereof, and the top of the housing body 12 may be opened. The rotating cam 50 may be rotatably installed on both side surfaces of the housing body 12, and the power transmission gear 18 engaged with the rotating cam 50 may also be rotatably installed on the housing body 12 while protruding from the outside of the housing body 12.

The cover guide 14 may be positioned in the housing body 12 facing the cover member 20, and have a groove formed along a moving path of the cover member 20 so as to guide the cover member 20. The cover guide 14 may be installed at both sides of the top of the housing body 12. The cover guide 14 may have a guide groove 16 formed therein, the guide groove 16 serving to guide the cover member 20. The guide groove 16 may guide the cover member 20 in a downward slope direction, the cover member 20 being installed in the horizontal direction. Therefore, the cover member 20 can be easily opened/closed.

The power transmission gear 18 may be engaged with the rotating cam 50 while protruding from both sides of the housing body 12. The power transmission gear 18 may be rotated by power received from a separate driving motor (not illustrated) which is installed in the housing 10.

As illustrated in FIGS. 2, 5 and 6, the cover member 20 may be formed in various shapes, as long as the cover member 20 can be moved by the first gear member 60 and open/close the entrance of the housing 10. The cover member 20 in accordance with the present embodiment may include a cover body 22 and a protrusion 24.

The cover body 22 may be formed in a plate shape, and installed at a position facing the cover guide 14. The first gear member 60 may be connected to both sides of the cover body 22, and operated by the rotating cam 50.

The protrusion 24 may protrude from the cover body 22 so as to be inserted into the guide groove 16 formed in the cover guide 14. The protrusion 24 protruding from both sides of the cover body 22 may be inserted into the guide groove 16 of the cover guide 14, and guided by the guide groove 16.

As illustrated in FIGS. 7 and 8, the combiner 30 which is operated separately from the cover member 20 and protrudes outward from the inside of the housing 10 may be formed in various shapes, as long as the combiner 30 can reflect an image. The combiner 30 in accordance with the present embodiment may include a first body 32, a second body 34, a connection body 36, a body protrusion 37 and a tilt pin 38.

The first body 32 may be formed in a plate shape and extended in the top-to-bottom direction. The second body 34 may be extended in a downward curved shape from one side (bottom based on FIG. 7) of the first body 32.

The connection body 36 may be extended downward from both sides of the second body 34, and rotatably connected to the second gear member 70.

The body protrusion 37 may be detachably installed on a side surface of the connection body 36, and formed in a shape to cover a side surface of the combiner guide 40. Thus, the body protrusion 37 may be slid in the top-to-bottom direction along the combiner guide 40.

The tilt pin 38 may be formed in a pin shape protruding from the side surface of the connection body 36, and positioned on a moving path of the tilt gear member 90 as illustrated in FIG. 10. Therefore, when the tilt gear member 90 is rotated, a tilt protrusion of the tilt gear member 90 may pressurize the tilt pin 38, and thus adjust a tilt angle of the combiner 30.

The combiner guide 40 illustrated in FIGS. 2 and 7 to 9 may be formed in various shapes, as long as the combiner guide 40 can be positioned at a side surface facing the connection body 36 and guide the connection body 36 in the top-to-bottom direction.

Since the combiner guide 40 is erected at both inner sides of the housing 10 and the body protrusion 37 of the combiner 30 is installed in a shape to cover the cross-section of the combiner guide 40, the combiner 30 may be stably moved in the top-to-bottom direction. As illustrated in FIG. 9, one side (right side based on FIG. 9) of the combiner guide 40 may be formed in a protrusion shape while forming a stepped portion, and the body protrusion 37 may come in surface contact with the protrusion of the combiner guide 40 while covering the protrusion.

As illustrated in FIGS. 2 to 4, the rotating cam 50 may be formed in various shapes, as long as the rotating cam 50 is rotatably installed on the housing 10, rotated by rotation power applied thereto, and has a plurality of guide grooves 54. The opening/closing of the cover member 20, the upward/downward movement of the combiner 30, and the tilt operation of the combiner 30 may be sequentially performed by the rotation of the rotating cam 50. The guide grooves 54 may be composed of three grooves, and the protrusions of the respective gear parts may be coupled to the grooves in order to implement the corresponding functions. The rotating cam 50 in accordance with the present embodiment may include a cam body 52, the guide grooves 54, an open protrusion 51 and a close protrusion 53.

The cam body 52 is a disk-shaped gear having teeth formed along the circumferential direction. The cam body 52 may have a gear formed on the outer circumference thereof and engaged with the power transmission gear 18. The cam body 52 may be rotatably installed at both sides or one side of the housing body 12.

The plurality of guide grooves 54 may be formed at a side surface of the cam body 52, facing the housing body 12, and guide the first gear member 60, the second gear member 70 and the tilt gear member 90. The guide grooves 54 in accordance with the present embodiment may include a first guide groove 55, a second guide groove 57 and a third guide groove 58.

The first guide groove 55 may be formed at the side surface of the cam body 52 such that the first gear member 60 is inserted into the first guide groove 55, the second guide groove 57 may be formed at the side surface of the cam body 52 such that the second gear member 70 is inserted into the second guide groove 57, and the third guide groove 58 may be formed at the side surface of the cam body 52 such that the tilt gear member 90 is inserted into the third guide groove 58.

Through the operation of the cam body 52, the first gear member 60 inserted into the first guide groove 55 may be first operated. When the operation of the first gear member 60 is completed, the second gear member 70 inserted into the second guide groove 57 may be operated. Then, when the operation of the second gear member 70 is completed, the tilt gear member 90 inserted into the third guide groove 58 may be operated. The shapes of the first to third guide grooves 55, 57 and 58 may be modified in various manners, such that the operations of the first and second gear members 60 and 70 and the tilt gear member 90 are sequentially performed through the rotation of the cam body 52. Each of the first to third guide grooves 55, 57 and 58 may have a section formed along the circumferential direction of the cam body 52. For example, the first guide groove 55 may be divided into a section formed along the circumferential direction of the cam body 52 and a section formed in a curved shape toward the center of the cam body 52. When a first protrusion 64 of the first gear member 60 inserted into the first guide groove 55 is positioned in the section formed along the circumferential direction, an external force may not be transferred to the first gear member 60. On the other hand, when the first protrusion 64 is positioned in the section formed in a curved shape toward the center of the cam body 52, an external force may be transferred to the first gear member 60 because the first protrusion 64 is moved while being pressed against the cam body 52.

The shapes of the first to third guide grooves 55, 57 and 58 may be designed in consideration of the configuration that the first and second gear members 60 and 70 and the tilt gear member 90 are sequentially operated by the rotation of the cam body 52. Since the design of the guide grooves 54 is publicly known to those skilled in the art, the detailed descriptions thereof are omitted herein.

Since the three guide grooves 54 are formed at the side surface of the cam body 52 and first to third protrusions 64, 74 and 96 are inserted into the respective guide grooves 54, the first and second gear members 60 and 70 and the tilt gear member 90 may be sequentially operated by the rotation of the rotating cam 50. Furthermore, since each of the guide grooves 54 has an invalid section which is a groove section corresponding to the rotation direction of the cam body 52, the operation completion times of the gear parts may be controlled.

The first protrusion 64 of the first gear member 60 may be inserted into the first guide groove 55, and an operation related to opening/closing of the cover member 20 may be performed by the rotation of the first guide groove 55. The second protrusion 74 of the second gear member 70 may be inserted into the second guide groove 57, and the combiner 30 may be moved upward/downward along the combiner guide 40 by the rotation of the second guide groove 57. The third protrusion 96 of the tilt gear member 90 may be inserted into the third guide groove 58, and the tilt gear member 90 having a three-link structure may be operated by the rotation of the third guide groove 58, and tilt the combiner 30.

Since the close protrusion 53 protruding in a lateral direction from the center of the cam body 52 and the open protrusion 51 protruding in a lateral direction from around the edge of the cam body 52 pressurize the corresponding contact sensors, the rotation state of the rotating cam 50 can be easily recognized.

The first gear member 60 may include various types of gears as long as one side of the first gear member 60 is connected to the cover member 20, the other side of the first gear member 60 is inserted into the guide groove 54, and the first gear member 60 is operated by the rotation of the rotating cam 50 and moves the cover member 20, as illustrated in FIGS. 2, 5 and 6. The first gear member 60 in accordance with the present embodiment may include two links and three parts which are rotatably connected to each other. Since the first gear member 60 is operated by the rotation of the rotating cam 50 and moves the cover member 20, the cover member 20 may open/close the top of the housing 10 along the cover guide 14.

When the combiner 30 is at the close position, the cover member 20 may be moved to the position at which the cover member 20 closes the top of the housing 10. With the combiner 30 stored in the housing 10, the cover member 20 may be positioned at the top of the combiner 30 such that the combiner 30 is not exposed to the outside. When the combiner 30 is used, the first gear member 60 may be operated by the rotation of the rotating cam 50, and move the cover member 20 to the open position. Thus, the cover member 20 can be moved to the top of the combiner 30.

The first gear member 60 in accordance with the present embodiment may include first and second link members 62 and 66. The first protrusion 64 inserted into the first guide groove 55 may be formed on the first link member 62, and the first link member 62 may be hinge-connected to the housing 10. One side (bottom based on FIG. 5) of the first link member 62 may be rotatably connected to the housing 10, and the other side of the first link member 62 may be rotatably connected to the second link member 66. The first protrusion 64 protruding from the side surface of the first link member 62 may be inserted into the first guide groove 55, and moved along the first guide groove 55 by the rotation of the rotating cam 50.

One side of the second link member 66 may be rotatably connected to the first link member 62, and the other side of the second link member 66 may be rotatably connected to the cover member 20. The other side of the second link member 66 may be rotatably connected to both edges of the cover member 20.

Therefore, the first link member 62 may be rotated about a portion hinge-connected to the housing 10 with the first protrusion 64 by the rotation of the rotating cam 50, and the cover member 20 may be opened/closed while being moved along the cover guide 14 by the rotation of the first link member 62. The first gear member 60 may be positioned inside both side surfaces of the housing body 12, and the first protrusion 64 may be inserted into the first guide groove 55 through an arc-shaped groove formed at the side surface of the housing body 12.

The second gear member 70 may include various types of gears, as long as one side of the second gear member 70 is connected to the combiner 30, the other side of the second gear member 70 is inserted into the guide groove 54, and the rotating cam 50 is operated by the rotation of the rotating cam 50 and moves the combiner 30 to the outside or inside of the housing 10, as illustrated in FIGS. 2, 3 and 7 to 9.

Through the rotation of the rotating cam 50, the second gear member 70 may be operated to move the combiner 30 upward/downward. When the combiner 30 is moved along the combiner guide 40 and protrudes upward from the housing 10, the combiner 30 may be referred to as being located at the open position, and when the combiner 30 is moved into the housing 10 along the combiner guide 40, the combiner 30 may be referred to as being located at the close position. When the combiner 30 is not used, the combiner 30 may be moved to the close position. Therefore, the combiner 30 may be protected and guided so as not to interfere with a driver's view.

The second gear member 70 connected to the rotating cam 50 may move the combiner 30 while being rotated in connection with the rotation of the rotating cam 50. The second gear member 70 may have a three-link structure, and a moving path of the combiner 30 may be decided by the combiner guide 40 and the body protrusion 37. As illustrated in FIG. 9, the body protrusion 37 may be stably moved because the combiner guide 40 and the body protrusion 37 are brought in three-surface or multi-surface contact with each other.

The second gear member 70 in accordance with the present embodiment may include a moving gear part 72, a rotating gear part 80, a first connection gear 82 and a second connection gear 84. The moving gear part 72 may have the second protrusion 74 inserted into the second guide groove 57. The moving gear part 72 in accordance with the present embodiment may include a moving gear body 73, the second protrusion 74 and an outer gear 76.

One side of the moving gear body 73 may be rotatably connected to the housing body 12, and the outer gear 76 may be formed at the other side of the moving gear body 73. The second protrusion 74 protruding from the side surface of the moving gear body 73 may be inserted into the second guide groove 57, moved along the second guide groove 57 by the rotation of the rotating cam 50, and rotated with the moving gear body 73.

The outer gear 76 may be formed in an arc shape at the other side of the moving gear body 73. Therefore, when the moving gear body 73 is rotated, the outer gear 76 formed on the moving gear part 72 may be engaged and rotated with the rotating gear part 80.

The rotating gear part 80 may be engaged and rotated with the outer gear 76 formed on the side surface of the moving gear part 72, and rotatably connected to the housing body 12. The rotating gear part 80 may be formed in a fan shape, and have a gear formed on the outer circumferential surface thereof, the gear being engaged with the outer gear 76. Therefore, when the moving gear part 72 is rotated, the rotating gear part 80 engaged with the moving gear part 72 may be rotated.

The first connection gear 82 is a link-shaped gear which is rotatably connected to the combiner 30. One side of the second connection gear 84 may be rotatably connected to the first connection gear 82, and the other side of the second connection gear 84 may be fixed to the rotating gear part 80.

Since the body of the second connection gear 84 is curved in an arc shape and the other side of the second connection gear 84 is fixed to the rotating gear part 80, the second connection gear 84 may be rotated with the rotating gear part 80. One side of the second connection gear 84 may be hinge-connected to the first connection gear 82, and the other side of the second connection gear 84 may be rotatably connected to the connection body 36 or the body protrusion 37 of the combiner 30.

Therefore, when the moving gear part 72 is rotated by the rotation of the rotating cam 50 and the rotating gear part 80 engaged with the moving gear part 72 is rotated, the second connection gear 84 may also be rotated with the rotating gear part 80. Then, while the first connection gear 82 hinge-connected to the second connection gear 84 is moved, the combiner 30 may be moved upward/downward.

The tilt gear member 90 may include various types of gears, as long as the tilt gear member 90 is connected to the guide groove 54, and operated by the rotation of the rotating cam 50 so as to adjust the angle of the combiner 30 as illustrated in FIGS. 2, 3 and 10.

The angle of the combiner 30 deployed upward may be adjusted through an operation of the tilt gear member 90. Since the angle of the combiner 30 is adjusted in such a manner that the combiner 30 can be tilted about a preset center axis, the position of a virtual image can be adjusted according to a driver's eye level.

The tilt gear member 90 in accordance with the present embodiment may include a tilt lever part 92, a tilt protrusion member 98 and a tilt spring 99. The third protrusion 96 inserted into the third guide groove 58 may be formed on the tilt lever part 92, and the tilt lever part 92 may be rotated by the operation of the rotating cam 50. The tilt lever part 92 may be formed in a plate shape, and positioned outside both sides of the housing body 12. The tilt lever part 92 in accordance with the present embodiment may include a tilt lever body 93, a first groove 94, a second groove 95 and the third protrusion 96.

The tilt lever body 93 may be installed outside the housing body 12 with the rotating cam 50, and the first and second grooves 94 and 95 may be formed in the tilt lever body 93. Since pins are inserted into the first and second grooves 94 and 95 forming a long hole and fixed to the side surface of the housing body 12, the tilt lever body 93 may be guided along the first and second grooves 94 and 95. The third protrusion 96 may protrude from the side surface of the tilt lever body 93 so as to be inserted into the guide groove 54 of the rotating cam 50. The third protrusion 96 inserted into the third guide groove 58 may be operated by the rotation of the rotating cam 50.

The tilt protrusion member 98 may be bent from the tilt lever part 92 toward the combiner 30, and locked to a tilt pin 38 installed at the side surface of the combiner 30. One side of the tilt spring 99 may be connected to the tilt protrusion member 98, and the other side of the tilt spring 99 may be connected to the housing 10. Therefore, the tilt lever part 92 from which an external force is removed may be moved to the initial position by an elastic force of the tilt spring 99.

The tilt pin 38 protruding in a lateral direction from the connection body 36 may be positioned on a moving path of the tilt protrusion member 98. As illustrated in FIG. 10, the combiner 30 may be tilted about the protrusion formed on the side surface of the upper portion of the connection body 36 during a tilt operation.

The first and second bodies 32 and 34 constituting the combiner 30 may be fixed to the connection body 36, and the connection body 36 may be tilted about the protrusion formed on the side surface thereof by the operation of the tilt gear member 90.

When the tilt lever part 92 to which the tilt spring 99 is connected is moved by the rotation of the rotating cam 50, the tilt protrusion member 98 may push the tilt pin 38.

The tilt gear member 90 related to the tilt of the combiner 30 and the second gear member 70 related to the deployment of the combiner 30 may be separated from each other. Only in case of necessity, the tilt pin 38 and the tilt protrusion member 98 may be brought in contact with each other so as to perform the tilt function of the combiner 30.

The first and second gear members 60 and 70 and the tilt gear member 90 may be installed at positions facing the rotating cam 50, and the lengths of the first to third protrusions 64, 74 and 96 may be adjusted to prevent interference between the respective gear parts.

Hereafter, the operation of the HUD apparatus 1 for a vehicle in accordance with the embodiment of the present invention will be described in detail with reference to the accompanying drawings.

Referring to FIGS. 1 to 6, the opening operation of the cover member 20 will be described. A motor module constituted by a motor and decelerator may be activated to rotate the power transmission gear 18. The rotating cam 50 engaged with the power transmission gear 18 may be rotated by the operation of the power transmission gear 18.

The first to third guide grooves 55, 57 and 58 in the rotating cam 50 may be rotated by the rotation of the rotating cam 50. The first protrusion 64 may be moved according to the rotation of the first guide groove 55, and the first link member 62 may be moved with the first protrusion 64. Since the cover member 20 is moved while the second link member 66 is moved by the movement of the first link member 62, the cover member 20 may be opened while the protrusion 24 of the cover member 20 may be moved along the guide groove 16.

When the cover member 20 is completely opened, the rotating cam 50 may be additionally rotated to operate the second gear member 70 as illustrated in FIGS. 2, 3 and 7 to 9. Since the second protrusion 74 is moved along the second guide groove 57 by the rotation of the second guide groove 57, the moving gear part 72 may be rotated.

Since the outer gear 76 formed at the outside of the moving gear part 72 is engaged with the rotating gear part 80, the rotating gear part 80 may be rotated by the rotation of the moving gear part 72. When the second connection gear 84 fixed to the rotating gear part 80 is rotated to move the first connection gear 82, the connection body 36 connected to the first connection gear 82 may be moved upward/downward.

Since the body protrusion 37 fastened to the connection body 36 is moved upward along the combiner guide 40, the combiner 30 may be moved upward to reach the open position.

When the combiner 30 is moved to the open position as illustrated in FIGS. 2, 3 and 10, the third protrusion 96 locked to the third guide groove 58 may be moved to rotate the tilt lever part 92. Since the tilt protrusion member 98 pressurizes the tilt pin 38 through the rotation of the tilt lever part 92, a tilt operation may be performed while the connection body 36 is tilted. Therefore, the installation angle of the combiner 30 may be adjusted.

Now, the closing operation of the HUD apparatus 1 for a vehicle will be described as follow. When the power transmission gear 18 is rotated in the reverse direction of the opening operation, the rotating cam 50 engaged with the power transmission gear 18 may be rotated in the reverse direction of the opening operation.

The tilt gear member 90 may be operated by the reverse rotation of the third guide groove 58, and tilt the combiner 30 in the reverse direction.

With the combiner 30 moved into the housing 10 by the reverse rotation of the second guide groove 57, the cover member 20 may cover the top of the housing 10 through the reverse rotation of the first guide groove 55.

Therefore, since the opening operation of the cover member 20, the pop-up operation of the combiner 30, and the tilt operation of the combiner 30 are performed by the rotation of the rotating cam 50, the deployment of the HUD apparatus 1 for a vehicle may be rapidly performed while noise is reduced. Therefore, the operation quality of the driving mechanism can be improved.

In accordance with the embodiment of the present invention, since the protrusion 24 formed on the cover member 20 is moved along the cover guide 14, noise caused by the operation of the cover member 20 can be reduced, and the opening/closing performance of the cover member 20 can be improved. Furthermore, since the combiner 30 is moved upward/downward along the combiner guide 40, noise can be reduced when the combiner 30 is moved upward/downward, the opening/closing performance of the combiner 30 can be improved. Furthermore, since the opening/closing operation of the cover member, the upward/downward movement of the combiner 30 and the tilt operation of the combiner 30 are performed by the rotation of the rotating cam 50, the number of parts related to the operations of the cover member 20 and the combiner 30 can be reduced, which makes it possible to improve the productivity.

Although exemplary embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A head-up display (HUD) apparatus for a vehicle, comprising:
    a housing mounted in a vehicle;
    a cover member configured to open/close an entrance of the housing;
    a combiner configured to be operated separately from the cover member, and protruding outward from the inside of the housing;
    a rotating cam rotatably installed in the housing, the rotating cam configured to be rotated by rotation power applied thereto and having a plurality of guide grooves;
    a first gear member having a first side connected to the cover member and a second side inserted into a first guide groove, and configured to be operated by the rotation of the rotating cam so as to move the cover member;
    a second gear member having a first side connected to the combiner and a second side inserted into a second guide groove, and configured to be operated by the rotation of the rotating cam so as to move the combiner to the outside or inside of the housing; and
    a tilt gear member connected to a third guide groove, and configured to be operated by the rotation of the rotating cam so as to adjust the angle of the combiner,
    wherein:
    the cover member comprises:
        a cover body connected to the first gear member, and installed at a position facing the cover guide; and
        a protrusion protruding from the cover body;
    the cover body is a single continuous piece;
    the rotating cam comprises:
        a cam body comprising teeth formed along a circumference of the cam body;
        a first guide groove formed at a side surface of the cam body such that the first gear member is inserted into the first guide groove;
        a second guide groove formed at the side surface of the cam body such that the second gear member is inserted into the second guide groove; and
        a third guide groove formed at the side surface of the cam body such that the tilt gear member is inserted into the third guide groove; and
    the first gear member comprises:
        a first link member having a first protrusion inserted into the first guide groove, and hinge-connected to the housing; and
        a second link member having a first side rotatably connected to the first link member and a second side rotatably connected to the cover member.

2. The HUD apparatus of claim 1, wherein the housing comprises:
    a housing body having the rotating cam rotatably installed on a side surface thereof, and having an opened top; and
    a cover guide positioned in the housing body facing the cover member, and having a guide groove formed along a moving part of the cover member so as to guide the cover member.

3. The HUD apparatus of claim 2, wherein the protrusion is inserted into the guide groove formed in the cover guide.

4. The HUD apparatus of claim 1, wherein the combiner comprises:
    a first body having a plate shape;
    a second body extended from one side of the first body and having a curved shape; and
    a connection body extended from both sides of the second body, and rotatably connected to the second gear member.

5. A head-up display (HUD) apparatus for a vehicle, comprising:
    a housing mounted in a vehicle;
    a cover member configured to open/close an entrance of the housing;
    a combiner configured to be operated separately from the cover member, and protruding outward from the inside of the housing, the combiner comprising:
        a first body having a plate shape;
        a second body extended from one side of the first body and having a curved shape; and
        a connection body extended from both sides of the second body, and rotatably connected to the second gear member;
    a rotating cam rotatably installed in the housing, the rotating cam configured to be rotated by rotation power applied thereto and having a plurality of guide grooves;
    a first gear member having a first side connected to the cover member and a second side inserted into a first guide groove, and configured to be operated by the rotation of the rotating cam so as to move the cover member;
    a second gear member having a first side connected to the combiner and a second side inserted into a second guide groove, and configured to be operated by the rotation of the rotating cam so as to move the combiner to the outside or inside of the housing; and
a combiner guide positioned at a side surface facing the connection body, and configured to guide the connection body in a top-to-bottom direction,
wherein the combiner further comprises a body protrusion detachably installed on the connection body, and covering a side surface of the combiner guide.

6. A head-up display (HUD) apparatus for a vehicle, comprising:
a housing mounted in a vehicle;
a cover member configured to open/close an entrance of the housing;
a combiner configured to be operated separately from the cover member, and protruding outward from the inside of the housing;
a rotating cam rotatably installed in the housing, the rotating cam configured to be rotated by rotation power applied thereto and having a plurality of guide grooves;
a first gear member having a first side connected to the cover member and a second side inserted into a first guide groove, and configured to be operated by the rotation of the rotating cam so as to move the cover member;
a second gear member having a first side connected to the combiner and a second side inserted into a second guide groove, and configured to be operated by the rotation of the rotating cam so as to move the combiner to the outside or inside of the housing; and
a tilt gear member connected to a third guide groove, and configured to be operated by the rotation of the rotating cam so as to adjust the angle of the combiner,
wherein:
the cover member comprises:
  a cover body connected to the first gear member, and installed at a position facing the cover guide; and
  a protrusion protruding from the cover body;
the cover body is a single continuous piece;
the rotating cam comprises:
  a cam body comprising teeth formed along a circumference of the cam body;
  a first guide groove formed at a side surface of the cam body such that the first gear member is inserted into the first guide groove;
  a second guide groove formed at the side surface of the cam body such that the second gear member is inserted into the second guide groove; and
  a third guide groove formed at the side surface of the cam body such that the tilt gear member is inserted into the third guide groove; and
the second gear member comprises:
  a moving gear part having a second protrusion inserted into the second guide groove;
  a rotating gear part engaged and configured to be rotated with an outer gear formed at a side surface of the moving gear part;
  first connection gear rotatably connected to the combiner; and
  a second connection gear having a first side rotatably connected to the first connection gear and a second side fixed to the rotating gear part.

7. A head-up display (HUD) apparatus for a vehicle, comprising:
a housing mounted in a vehicle;
a cover member configured to open/close an entrance of the housing;
a combiner configured to be operated separately from the cover member, and protruding outward from the inside of the housing;
a rotating cam rotatably installed in the housing, the rotating cam configured to be rotated by rotation power applied thereto and having a plurality of guide grooves;
a first gear member having a first side connected to the cover member and a second side inserted into a first guide groove, and configured to be operated by the rotation of the rotating cam so as to move the cover member;
a second gear member having a first side connected to the combiner and a second side inserted into a second guide groove, and configured to be operated by the rotation of the rotating cam so as to move the combiner to the outside or inside of the housing; and
a tilt gear member connected to a third guide groove, and configured to be operated by the rotation of the rotating cam so as to adjust the angle of the combiner,
wherein:
the rotating cam comprises:
  a cam body comprising teeth formed along a circumference of the cam body;
  a first guide groove formed at a side surface of the cam body such that the first gear member is inserted into the first guide groove;
  a second guide groove formed at the side surface of the cam body such that the second gear member is inserted into the second guide groove; and
  a third guide groove formed at the side surface of the cam body such that the tilt gear member is inserted into the third guide groove; and
the tilt gear member comprises:
  a tilt lever part having a third protrusion inserted into the third guide groove; and
  a tilt protrusion member bent from the tilt lever part toward the combiner, and locked to a tilt pin installed at a side surface of the combiner.

* * * * *